United States Patent
Dandawate et al.

(10) Patent No.: US 10,876,031 B2
(45) Date of Patent: Dec. 29, 2020

(54) SILANE-BASED TACKIFIERS FOR TREATMENT OF SUBTERRANEAN FORMATIONS

(71) Applicant: Halliburton Energy Services, Inc., Houston, TX (US)

(72) Inventors: Monica Rajendra Dandawate, Pune (IN); Shoy George Chittattukara, Thrissur (IN); Rajender Salla, Pune (IN); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

(21) Appl. No.: 15/776,844

(22) PCT Filed: Dec. 31, 2015

(86) PCT No.: PCT/US2015/068282
§ 371 (c)(1),
(2) Date: May 17, 2018

(87) PCT Pub. No.: WO2017/116467
PCT Pub. Date: Jul. 6, 2017

(65) Prior Publication Data
US 2018/0346801 A1    Dec. 6, 2018

(51) Int. Cl.
*C09K 8/506* (2006.01)
*C04B 28/02* (2006.01)
(Continued)

(52) U.S. Cl.
CPC .............. *C09K 8/506* (2013.01); *C04B 28/02* (2013.01); *C09K 8/467* (2013.01); *C09K 8/575* (2013.01);
(Continued)

(58) Field of Classification Search
None
See application file for complete search history.

(56) References Cited

U.S. PATENT DOCUMENTS

| | | | |
|---|---|---|---|
| 4,829,100 A * | 5/1989 | Murphey | C09K 8/805 523/131 |
| 5,775,425 A | 7/1998 | Weaver et al. | |

(Continued)

OTHER PUBLICATIONS

International Search Report and Written Opinion of PCT Application No. PCT/US2015/068282 dated Aug. 24, 2016: pp. 1-10.

*Primary Examiner* — Andrew Sue-Ako
(74) *Attorney, Agent, or Firm* — Chamberlain Hrdlicka

(57) ABSTRACT

Various embodiments disclosed relate to silane-based tackifiers for treatment of subterranean formations. In various embodiments, the present invention provides a method of treating a subterranean formation. The method includes placing in the subterranean formation a tackifier having the structure: or a salt thereof, wherein the variables are as defined herein.

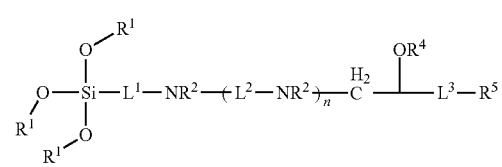

18 Claims, 4 Drawing Sheets

(51) Int. Cl.
    *C09K 8/467*     (2006.01)
    *C09K 8/80*     (2006.01)
    *C09K 8/68*     (2006.01)
    *E21B 43/02*     (2006.01)
    *C09K 8/575*     (2006.01)
    *E21B 43/04*     (2006.01)
    *E21B 43/267*     (2006.01)

(52) U.S. Cl.
    CPC .............. *C09K 8/68* (2013.01); *C09K 8/80* (2013.01); *C09K 8/805* (2013.01); *E21B 43/025* (2013.01); *E21B 43/04* (2013.01); *E21B 43/267* (2013.01); *Y02W 30/91* (2015.05)

(56) References Cited

U.S. PATENT DOCUMENTS

| | | |
|---|---|---|
| 5,787,986 A | 8/1998 | Weaver et al. |
| 5,833,000 A | 11/1998 | Weaver et al. |
| 5,839,510 A | 11/1998 | Weaver et al. |
| 5,853,048 A | 12/1998 | Weaver et al. |
| 5,871,049 A | 2/1999 | Weaver et al. |
| 5,960,878 A | 10/1999 | Nguyen et al. |
| 6,047,772 A | 4/2000 | Weaver et al. |
| 2005/0277554 A1 | 12/2005 | Blauch et al. |
| 2007/0102156 A1* | 5/2007 | Nguyen ............... E21B 43/267 166/280.2 |
| 2007/0277978 A1 | 12/2007 | Reddy et al. |
| 2010/0282465 A1 | 11/2010 | Weaver et al. |
| 2011/0257051 A1 | 10/2011 | Welton et al. |
| 2014/0190700 A1 | 7/2014 | Tang et al. |
| 2014/0311743 A1 | 10/2014 | Vo et al. |
| 2014/0311745 A1 | 10/2014 | Vo et al. |
| 2014/0357535 A1 | 12/2014 | Tang et al. |

\* cited by examiner

SILANE-BASED TACKIFIERS FOR TREATMENT OF SUBTERRANEAN FORMATIONS

BACKGROUND

The presence of particulate matter, such as sand, in produced fluids from hydrocarbon wells can be problematic. For example, particulates can abrade pumping and other production equipment and reduce the fluid production capabilities of the producing zones. Hydrocarbon wells are often located in subterranean zones that contain unconsolidated particulate matter that can migrate out of the well along with oil, gas, water, or other fluids produced by the well. Placing proppant downhole during hydraulic fracturing operations can result in unconsolidated proppant that can become entrained with produced fluids.

Tackifiers play an important role in controlling undesirable flowback of proppants and unconsolidated particulates into the wellbore that can significantly decrease production efficiency. Existing tackifier compositions are acrylate- and acrylamide-based compositions.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
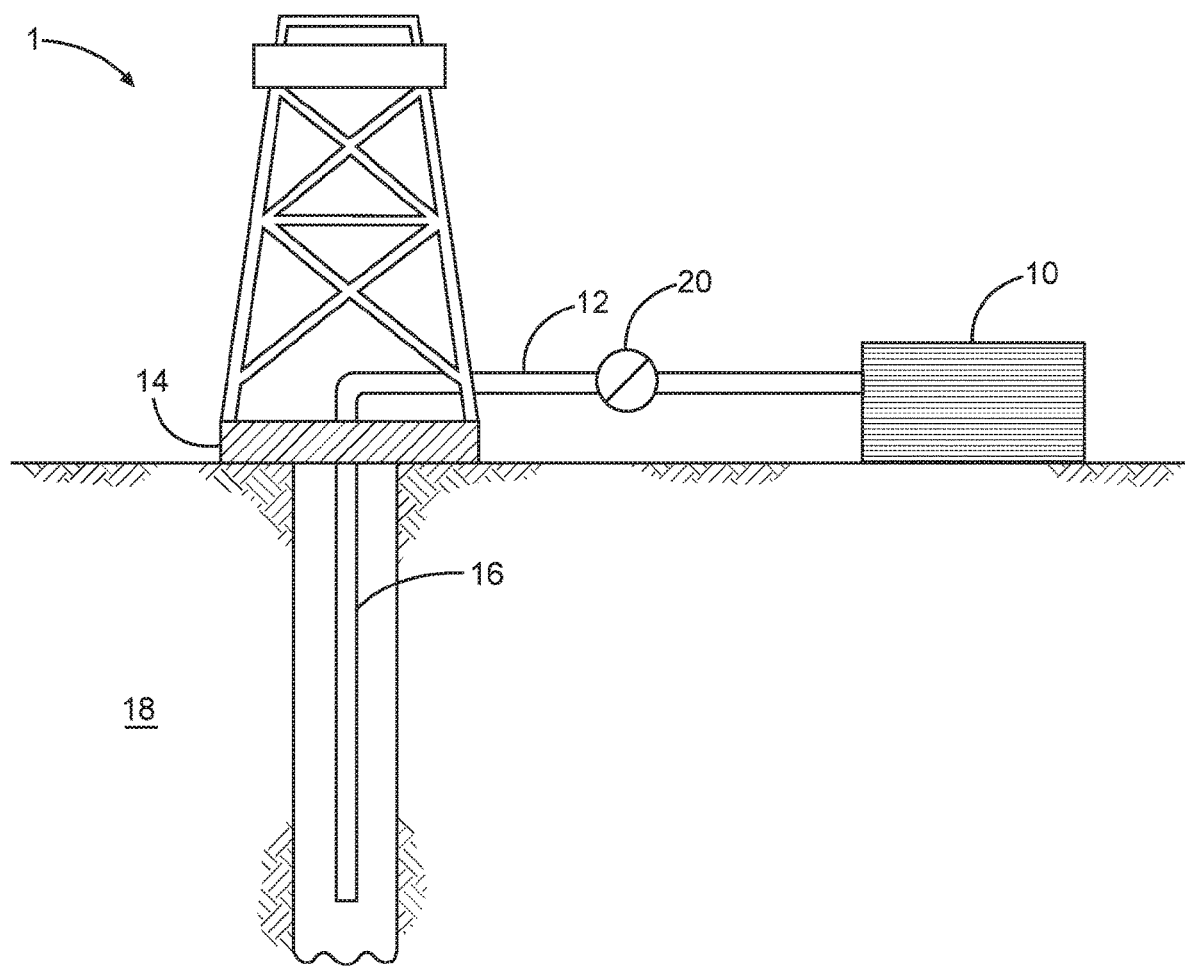
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms.

The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R), N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like, and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon," "hydrocarbyl," or "hydrocarbylene," as used herein, refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are positive integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid." Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material," "disproportionate permeability modifier," or "relative permeability modifier," refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens;

placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

In various embodiments, the present invention provides a method of treating a subterranean formation. The method includes placing in the subterranean formation a tackifier having the structure:

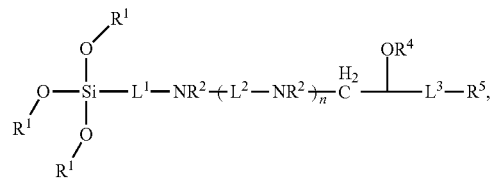

or a salt thereof. At each occurrence, $R^1$ is independently substituted or unsubstituted ($C_1$-$C_{20}$)hydrocarbyl. The variable $L^1$ is substituted or unsubstituted ($C_1$-$C_{20}$)hydrocarbylene. At each occurrence, $R^2$ is independently selected from the group consisting of —H, substituted or unsubstituted ($C_1$-$C_{20}$)hydrocarbyl, and -($L^2$-$NR^3$)$_n$—$R^3$. At each occurrence, $L^2$ is independently substituted or unsubstituted ($C_1$-$C_{20}$)hydrocarbylene. At each occurrence, $R^3$ is independently selected from the group consisting of —H, substituted or unsubstituted ($C_1$-$C_{20}$)hydrocarbyl, and -($L^2$-$NR^2$)$_n$—$R^2$. The variable $R^4$ is selected from the group consisting of —H and substituted or unsubstituted ($C_1$-$C_{20}$) hydrocarbyl. The variable $L^3$ is substituted or unsubstituted ($C_1$-$C_{20}$)hydrocarbylene interrupted or terminated by 0, 1, 2, or 3 groups independently selected from the group consisting of —O—, —S—, and substituted or unsubstituted —NH—. The variable $R^5$ is substituted or unsubstituted ($C_1$-$C_{20}$)hydrocarbyl. At each occurrence, n is independently about 0 to about 1,000.

In various embodiments, the present invention provides a method of treating a subterranean formation. The method includes placing in the subterranean formation a tackifier having the structure:

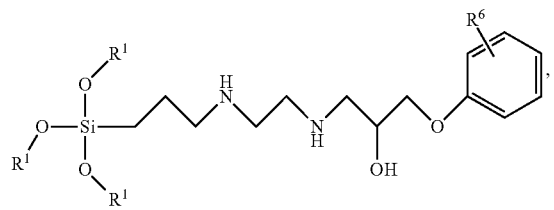

or a salt thereof. At each occurrence $R^1$ is independently selected from the group consisting of ($C_1$-$C_{20}$)alkyl and ($C_6$-$C_{20}$)aryl. The variable $R^6$ is independently selected from the group consisting of ($C_1$-$C_{20}$)alkyl and ($C_6$-$C_{20}$)aryl, wherein $R^6$ is ortho-, meta-, or para-substituted on the phenyl ring.

In various embodiments, the present invention provides a method of treating a subterranean formation. The method includes placing in the subterranean formation a tackifier having the structure:

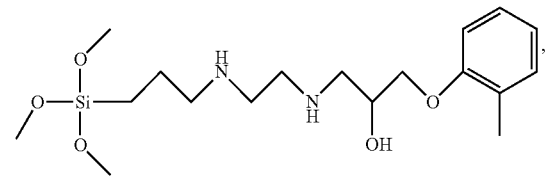 [SMILES: CO[Si](CCCNCCNCC(O)COc1ccccc1C)(OC)OC]

or a salt thereof.

In various embodiments, the present invention provides a system. The system includes a tubular disposed in a subterranean formation. The system also includes a pump configured to pump a composition including a tackifier in the subterranean formation through the tubular, wherein the tackifier has the structure:

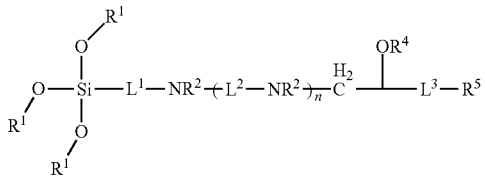

or a salt thereof. At each occurrence, $R^1$ is independently substituted or unsubstituted $(C_1-C_{20})$hydrocarbyl. The variable $L^1$ is substituted or unsubstituted $(C_1-C_{20})$hydrocarbylene. At each occurrence, $R^2$ is independently selected from the group consisting of —H, substituted or unsubstituted $(C_1-C_{20})$hydrocarbyl, and -$(L^2-NR)_n$—$R^3$. At each occurrence, $L^2$ is independently substituted or unsubstituted $(C_1-C_{20})$hydrocarbylene. At each occurrence, $R^3$ is independently selected from the group consisting of —H, substituted or unsubstituted $(C_1-C_{20})$hydrocarbyl, and -$(L^2-NR^2)_n$—$R^2$. The variable $R^4$ is selected from the group consisting of —H and substituted or unsubstituted $(C_1-C_{20})$ hydrocarbyl. The variable $L^3$ is substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ is substituted or unsubstituted $(C_1-C_{20})$hydrocarbyl. At each occurrence, n is independently about 0 to about 1,000.

In various embodiments, the present invention provides a tackifier for treatment of a subterranean formation. The tackifier has the structure:

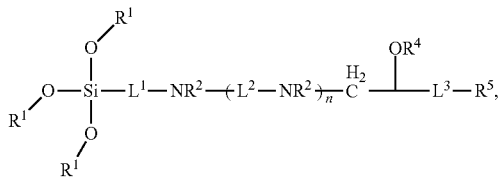

or a salt thereof. At each occurrence, $R^1$ is independently substituted or unsubstituted $(C_1-C_{20})$hydrocarbyl. The variable $L^1$ is substituted or unsubstituted $(C_1-C_{20})$hydrocarbylene. At each occurrence, $R^2$ is independently selected from the group consisting of —H, substituted or unsubstituted $(C_1-C_{20})$hydrocarbyl, and -$(L^2-NR^3)_n$—$R^3$. At each occurrence, $L^2$ is independently substituted or unsubstituted $(C_1-C_{20})$hydrocarbylene. At each occurrence, $R^3$ is independently selected from the group consisting of —H, substituted or unsubstituted $(C_1-C_{20})$hydrocarbyl, and -$(L^2-NR^2)_n$—$R^2$. The variable $R^4$ is selected from the group consisting of —H and substituted or unsubstituted $(C_1-C_{20})$ hydrocarbyl. The variable $L^3$ is substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ is substituted or unsubstituted $(C_1-C_{20})$hydrocarbyl. At each occurrence, n is independently about 0 to about 1,000.

In various embodiments, the present invention provides a tackifier for treatment of a subterranean formation. The tackifier has the structure:

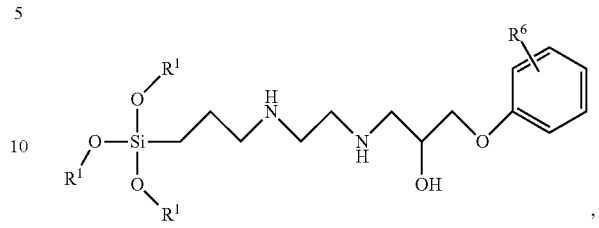

or a salt thereof. At each occurrence $R^1$ is independently selected from the group consisting of $(C_1-C_{20})$alkyl and $(C_6-C_{20})$aryl. The variable $R^6$ is independently selected from the group consisting of $(C_1-C_{20})$alkyl and $(C_6-C_{20})$aryl, wherein $R^6$ is ortho-, meta-, or para-substituted on the phenyl ring.

In various embodiments, the present invention provides a tackifier for treatment of a subterranean formation. The tackifier has the structure:

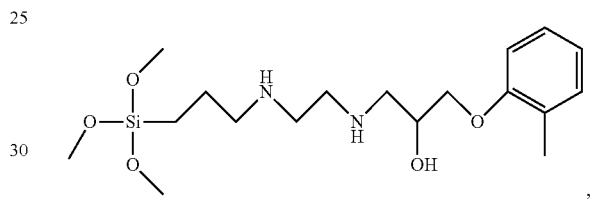

or a salt thereof.

In various embodiments, the present invention provides a method of preparing a composition for treatment of a subterranean formation. The method includes forming a composition including a tackifier having the structure:

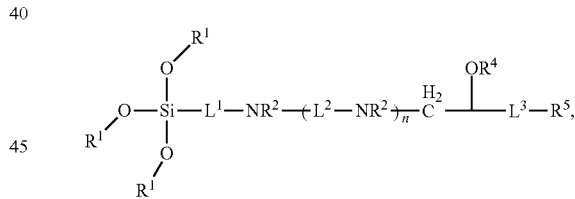

or a salt thereof. At each occurrence, $R^1$ is independently substituted or unsubstituted $(C_1-C_{20})$hydrocarbyl. The variable $L^1$ is substituted or unsubstituted $(C_1-C_{20})$hydrocarbylene. At each occurrence, $R^2$ is independently selected from the group consisting of —H, substituted or unsubstituted $(C_1-C_{20})$hydrocarbyl, and -$(L^2-NR^3)_n$—$R^3$. At each occurrence, $L^2$ is independently substituted or unsubstituted $(C_1-C_{20})$hydrocarbylene. At each occurrence, $R^3$ is independently selected from the group consisting of —H, substituted or unsubstituted $(C_1-C_{20})$hydrocarbyl, and -$(L^2-NR^2)_n$—$R^2$. The variable $R^4$ is selected from the group consisting of —H and substituted or unsubstituted $(C_1-C_{20})$ hydrocarbyl. The variable $L^3$ is substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ is substituted or unsubstituted $(C_1-C_{20})$hydrocarbyl. At each occurrence, n is independently about 0 to about 1,000.

In various embodiments, the present invention provides a method of preparing a tackifier for treatment of a subterranean formation. The method includes reacting a mixture including an epoxide component and an amine component to form the tackifier. The epoxide component has the structure:

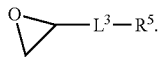

The amine component has the structure:

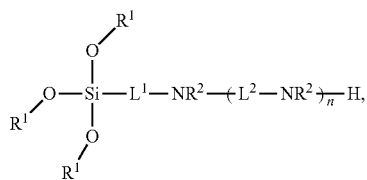

or a salt thereof. The tackifier has the structure:

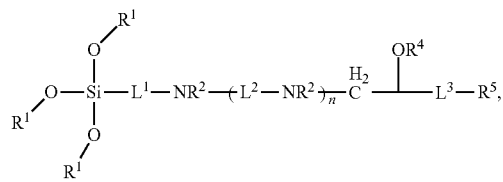

or a salt thereof. At each occurrence, $R^1$ is independently substituted or unsubstituted $(C_1\text{-}C_{20})$hydrocarbyl. The variable $L^1$ is substituted or unsubstituted $(C_1\text{-}C_{20})$hydrocarbylene. At each occurrence, $R^2$ is independently selected from the group consisting of —H, substituted or unsubstituted $(C_1\text{-}C_{20})$hydrocarbyl, and $-(L^2\text{-}NR)_n$—$R^3$. At each occurrence, $L^2$ is independently substituted or unsubstituted $(C_1\text{-}C_{20})$hydrocarbylene. At each occurrence, $R^3$ is independently selected from the group consisting of —H, substituted or unsubstituted $(C_1\text{-}C_{20})$hydrocarbyl, and $-(L^2\text{-}NR^2)_n$—$R^2$. The variable $R^4$ is selected from the group consisting of —H and substituted or unsubstituted $(C_1\text{-}C_{20})$hydrocarbyl. The variable $L^3$ is substituted or unsubstituted $(C_1\text{-}C_{20})$hydrocarbylene interrupted or terminated by 0, 1, 2, or 3 groups independently selected from the group consisting of —O—, —S—, and substituted or unsubstituted —NH—. The variable $R^5$ is substituted or unsubstituted $(C_1\text{-}C_{20})$hydrocarbyl. At each occurrence, n is independently about 0 to about 1,000.

In various embodiments, the silane-based tackifier and method of using the same for treatment of subterranean formations has certain advantages over other tackifiers and methods of using the same. For example, in various embodiments, the silane-based tackifier can consolidate a subterranean formation as well or better than conventional tackifiers, such as tackifiers that are condensation products of polyacids and polyamines. In various embodiments, the silane-based tackifier can have better thermal and mechanical stability than other tackifiers, retaining a greater amount of its tackiness after exposure to high temperature, mechanical deformation, or a combination thereof.

In various embodiments, the silane-based tackifier can remain tacky after exposure to water or hydrocarbons, even after long periods. In various embodiments, the silane-based tackifier can retain a larger amount of its tackiness after exposure to water, hydrocarbons, or a combination thereof, including under high temperature and high pressure conditions, as compared to other tackifiers. In various embodiments, the silane-based tackifier can remain tacky after exposure to mechanical deformation, even over extended periods. In various embodiments, the silane-based tackifier can retain a higher amount of its tackiness after exposure to mechanical deformation, including under high temperature and high pressure conditions, as compared to other tackifiers.

In various embodiments, the silane-based tackifier can form a stronger bond with proppants, gravel, sand, and subterranean surfaces than other tackifiers, providing greater strength using a smaller amount of tackifier as compared to other treatment methods. In some embodiments, a free hydroxy group can increase bonding strength to particulate or subterranean surfaces over other tackifiers, such as via reaction with silica surfaces (e.g., sand) to form —O—Si— bonds. In some embodiments, an Si—O-hydrocarbyl group on the tackifier can increase bonding strength to particulate or subterranean surfaces over other tackifiers, such as via reaction with silica surfaces (e.g., sand) to form —Si—O—Si bonds. In some embodiments, a more permeable consolidated material can be formed having the same or greater strength than a consolidated material formed using a larger amount of another tackifier. In various embodiments, by using a smaller amount of the silane-based tackifier, a greater regain permeability can be provided than other consolidating methods that provide similar consolidation strength but require larger amounts of tackifier. In some embodiments, a smaller amount of the silane-based tackifier can achieve an equivalent consolidating effect compared to other tackifiers in less time.

In various embodiments, the tackifier can be used in combination with other tackifiers. In various embodiments, the tackifier can provide good consolidation strength without decreasing or with only a minor decrease in permeability of formations that include large amounts of fines and clays. In various embodiments, a proppant or gravel coated with the tackifier can have enhanced strength and crush resistance compared to a corresponding proppant or gravel that is free of the coating. In various embodiments, a proppant or gravel coated with the tackifier can generate less dust during handling. In various embodiments, the tackifier can be effectively used for consolidation in a diluted form.

In various embodiments, the silane-based tackifier can be formed downhole from an epoxy component and an amine component that together have substantially reduced tackiness and viscosity compared to the tackifier, such that tackiness does not ensue until the materials are downhole. In various embodiments, the lower viscosity of the epoxy component and the amine component can enable better penetration into the subterranean formation and can provide better consolidation not only in the near wellbore region, but also deeper in the formation, even in formations with lower permeabilities or higher fines content.

Method of Treating a Subterranean Formation.

In various embodiments, the present invention provides a method of treating a subterranean formation. The method includes placing in the subterranean formation a silane-based tackifier having the structure:

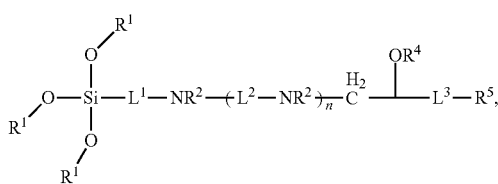

or a salt thereof. At each occurrence, $R^1$ can be independently substituted or unsubstituted $(C_1\text{-}C_{20})$hydrocarbyl. The variable $L^1$ can be substituted or unsubstituted $(C_1\text{-}C_{20})$ hydrocarbylene. At each occurrence, $R^2$ can be independently selected from the group consisting of —H, substituted or unsubstituted $(C_1\text{-}C_{20})$hydrocarbyl, and -$L^2$-$NR_3)_n$—$R^3$. At each occurrence, $L^2$ can be independently substituted or unsubstituted $(C_1\text{-}C_{20})$hydrocarbylene. At each occurrence, $R^3$ can be independently selected from the group consisting of —H, substituted or unsubstituted $(C_1\text{-}C_{20})$hydrocarbyl, and -$(L^2\text{-}NR^2)_n$—$R^2$. The variable $R^4$ can be selected from the group consisting of —H and substituted or unsubstituted $(C_1\text{-}C_{20})$hydrocarbyl. The variable $L^1$ can be substituted or unsubstituted $(C_1\text{-}C_{20})$hydrocarbylene interrupted or terminated by 0, 1, 2, or 3 groups independently selected from the group consisting of —O—, —S—, and substituted or unsubstituted —NH—. The variable $R^5$ can be substituted or unsubstituted $(C_1\text{-}C_{20})$hydrocarbyl. At each occurrence, n can be independently about 0 to about 1,000.

In some embodiments, the silane-based tackifier can be placed in the subterranean formation neat. In some embodiments, the silane-based tackifier can be placed in the subterranean formation as a component of a composition, or as a mixture including the composition. For example, a subterranean treatment fluid can include the silane-based tackifier, wherein the subterranean treatment fluid is a stimulation fluid (e.g., acidization or hydraulic fracturing), a consolidation fluid (e.g., for consolidating the subterranean formation surrounding a wellbore, such as near-wellbore portions of the subterranean formation), a hydraulic fracturing fluid, a pre-pad fluid, a pad fluid (e.g., wherein pre-pad fluid or pad fluid can be used to consolidate or stabilize the subterranean formation surrounding a wellbore, such as near-wellbore portions of the subterranean formation, or for consolidating or stabilizing formations adjacent to fracture faces of created fractures), a proppant slurry, a spotting fluid, a remedial treatment fluid (e.g., for consolidating near-wellbore portions of the subterranean formation surrounding a wellbore, or for consolidating or stabilizing proppant pack in propped fractures), a pill, an acidizing fluid, a cementing fluid, a packer fluid, a gravel packing fluid, or a combination thereof. The placing of the tackifier in the subterranean formation can including placing the subterranean treatment fluid that includes the tackifier in the subterranean formation. The method can include performing a subterranean formation treatment operation in the subterranean formation, such as using the subterranean treatment fluid that includes the tackifier, or using a subterranean treatment fluid that is free of the tackifier but with placement of the tackifier in the subterranean formation before or after placing the subterranean treatment fluid in the subterranean formation. The method can include hydraulic fracturing (e.g., pad stage, pre-pad, or slurry), consolidation, stimulation, spotting, remedial treatment, acidizing, cementing, packing, gravel packing, or a combination thereof. The subterranean treatment fluid can be a hydraulic fracturing fluid. The method can include hydraulically fracturing the subterranean formation with a hydraulic fracturing fluid including the tackifier or with a mixture including the same. The method can include consolidating particulates, proppant, or a combination thereof, with the tackifier, a composition including the same, or with a mixture including the composition.

In various embodiments, the method can include reacting a mixture including an amine component and an epoxide component, such as any suitable such components described herein, to form the tackifier. The reacting can occur above-surface, downhole, or any combination thereof. In embodiments wherein the reacting occurs downhole, the method can including placing the mixture including the amine component and the epoxide component in the subterranean formation.

A composition including the silane-based tackifier can include one silane-based tackifier, or more than one silane-based tackifier. The one or more silane-based tackifiers can form any suitable proportion of the composition, such as about 0.001 wt % to about 100 wt %, or about 0.01 wt % to about 50 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more.

The method can include obtaining or providing a composition including the silane-based tackifier above-surface, such as wherein one or more components of the composition are mixed together above-surface to form the composition. The method can include subsequently placing a composition including the tackifier formed above-surface in the subterranean formation. The method can include obtaining or providing a composition including the silane-based tackifier in the subterranean formation, such as wherein one or more components of the composition are mixed together in the subterranean formation to form the composition. When the composition is obtained or provided in the subterranean formation, the formation of the composition in the subterranean formation can be placing the composition in the subterranean formation (e.g., the moment the composition has been created in the subterranean formation, it has also been placed there).

The placing of the tackifier or composition including the same in the subterranean formation can include contacting the tackifier or composition including the same and any suitable part of the subterranean formation, or contacting the tackifier or composition including the same and a subterranean material, such as any suitable subterranean material. The subterranean formation can be any suitable subterranean formation. In some examples, the placing of the tackifier or composition including the same in the subterranean formation includes contacting the tackifier or composition including the same with or placing the tackifier or composition including the same in at least one of a fracture, at least a part of an area surrounding a fracture, a flow pathway, an area surrounding a flow pathway, and an area desired to be fractured. The placing of the tackifier or composition including the same in the subterranean formation can be any suitable placing and can include any suitable contacting between the subterranean formation and the tackifier or composition including the same. The placing of the tackifier or composition including the same in the subterranean formation can include at least partially depositing the tackifier or composition including the same in a fracture, flow pathway, or area surrounding the same.

The method can include hydraulic fracturing, such as a method of hydraulic fracturing to generate a fracture or flow pathway. The placing of the tackifier or composition including the same in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The composition can be a hydraulic fracturing fluid, a pre-pad fluid, a pad fluid, a proppant slurry, or a combination thereof. The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

The method can include performing a hydraulic fracturing treatment with a composition including the tackifier and proppant which consolidates the proppant for proppant flowback control. The method can include using a pad fluid including the tackifier for stabilizing the fracture faces to mitigate formation sand and fines from invading the proppant pack. The method can include injecting the composition into the subterranean formation near the wellbore for consolidating and stabilizing the formation sand and fines for sand control in stand-alone screen completion. The method can include injecting the composition into the subterranean formation near the wellbore before or after the gravel pack treatment for consolidating and stabilizing the formation sand and fines for sand control. The method can include injecting the composition into the propped fractures as a remedial treatment to hold the proppant (that has been placed in the fractures) in place.

In addition to the silane-based tackifier, the composition can further include at least one of proppant and gravel. The proppant, gravel, or combination thereof, can form any suitable proportion of the composition, or a mixture including the same, such as about 1 wt % to about 90 wt %, about 5 wt % to about 70 wt %, or about 1 wt % or less, or less than, equal to, or greater than about 2 wt %, 3, 4, 5, 6, 7, 8, 9, 10, 12, 14, 16, 18, 20, 25, 30, 35, 40, 45, 50, 55, 60, 65, 70, 75, 80, 85 wt %, or about 90 wt % or more. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, formation cuttings (e.g., reinjected), hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.0001 mm to about 3 mm, about 0.015 mm to about 2.5 mm, about 0.025 mm to about 0.43 mm, about 0.043 mm to about 0.85 mm, about 0.085 mm to about 1.18 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition, or a mixture including the same, can include any suitable amount of proppant.

In some embodiments, the tackifier can be at least partially coated on the proppant or gravel. In some embodiments, a curable mixture including an amine component and an epoxide component, such as any suitable embodiments of such components described herein, can be coated on the proppant or gravel and can be cured downhole to form the silane-based tackifier on the proppant or gravel.

The composition can further include a carrier liquid. The carrier liquid can be any one or more liquids suitable for suspending, dissolving, mixing, or emulsifying with the silane-based tackifier, and optionally with one or more other materials, to form a composition. The composition can include a foam, an emulsion, a microemulsion, a nanoemulsion, can be aqueous based, oil-based, or a combination thereof. In some embodiments, the composition can be substantially free of foams, emulsions, or a combination thereof. In various embodiments, the carrier liquid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The water can be a salt water. The salt can be any suitable salt, such as at least one of NaBr, $CaCl_2$, $CaBr_2$, $ZnBr_2$, KCl, NaCl, a carbonate salt, a sulfonate salt, sulfite salts, sulfide salts, a phosphate salt, a phosphonate salt, a magnesium salt, a bromide salt, a formate salt, an acetate salt, and a nitrate salt. The water can have any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The water can have any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the water can have a concentration of at least one of NaBr, CaCl$_2$, CaBr$_2$, ZnBr$_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more. The carrier liquid can form any suitable proportion of the composition, such as about 0.001 wt % to about 99.999 wt % of a composition, or about 0.001 wt % or less, or less than, equal to, or greater than about 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In one embodiment, the method can include treating proppant on the fly during a hydraulic fracturing treatment or a screenless frac-pack treatment. The method can include coating the tackifier, a composition including the same, or a mixture curable to form the tackifier on a proppant while the proppant is being mixed in a fracturing carrier fluid; injecting the proppant slurry into a wellbore to be placed in a generated fracture located in the subterranean formation; and optionally allowing the system to cure at formation temperature (in embodiments wherein a curable mixture is coated on the proppant).

In another embodiment, a method of treating the formation with the composition includes: injecting the composition or a mixture curable to form the tackifier into the formation interval that requires treatment; postflushing with a solvent or a gas; and optionally allowing the system to cure at formation temperature (in embodiments wherein a curable mixture is coated on the proppant).

In one embodiment, the present invention provides a method of treating proppant using a wet coat or on the fly method, such as during a hydraulic fracturing treatment, wherein the tackifier, a composition including the same, or a mixture curable to form the tackifier, is coated on the proppant. In another embodiment, the present invention provides a method of dry coating or pretreating the proppant prior to a fracturing treatment, generally including applying the tackifier, a composition including the same, or a mixture curable to form the tackifier, to the dry proppant.

The method can further include applying a preflush solution to the subterranean formation. The preflush solution can be any suitable preflush solution. For example, the preflush solution can ready the subterranean material to receive the tackifier or composition including the same and can remove oils that can impede the tackifier or composition including the same from making contact with particulates that are desired to be consolidated. The preflush solution can include an aqueous liquid. The aqueous liquid in the preflush solution can include at least one of salt water and brine. The preflush solution can include a surfactant. The surfactant in the preflush solution can include at least one of an ethoxylated nonyl phenol phosphate ester, a cationic surfactant, a non-ionic surfactant, an alkyl phosphonate surfactant, or mixtures thereof.

The method can further include applying an afterflush fluid to the subterranean formation. For example, the afterflush fluid can displace the tackifier or composition including the same from selected areas of the wellbore to remove the tackifier or composition including the same from the pore spaces inside the subterranean formation and thereby restore permeability while leaving behind tackifier at, for example, contact points between the subterranean formation and particulates such that the particulates can be consolidated. The afterflush fluid can be any suitable afterflush fluid, such as at least one of salt water, brine, and nitrogen gas.

Silane-Based Tackifier.

The silane-based tackifier can have the following structure:

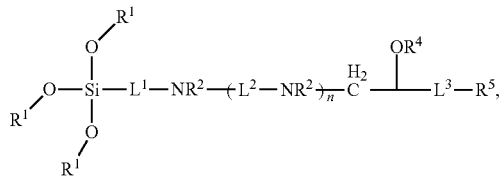

or a salt thereof. At each occurrence, $R^1$ can be independently substituted or unsubstituted $(C_1\text{-}C_{20})$hydrocarbyl. The variable $L^1$ can be substituted or unsubstituted $(C_1\text{-}C_{20})$hydrocarbylene. At each occurrence, $R^2$ can be independently selected from the group consisting of —H, substituted or unsubstituted $(C_1\text{-}C_{20})$hydrocarbyl, and -$(L^2\text{-}NR^3)_n$—$R^3$. At each occurrence, $L^2$ can be independently substituted or unsubstituted $(C_1\text{-}C_{20})$hydrocarbylene. At each occurrence, $R^3$ can be independently selected from the group consisting of —H, substituted or unsubstituted $(C_1\text{-}C_{20})$hydrocarbyl, and -$L^2\text{-}NR^2)_n$—$R^2$. The variable $R^4$ can be selected from the group consisting of —H and substituted or unsubstituted $(C_1\text{-}C_{20})$hydrocarbyl. The variable $L^3$ can be substituted or unsubstituted $(C_1\text{-}C_{20})$hydrocarbylene interrupted or terminated by 0, 1, 2, or 3 groups independently selected from the group consisting of —O—, —S—, and substituted or unsubstituted —NH— The variable $R^5$ can be substituted or unsubstituted $(C_1\text{-}C_{20})$hydrocarbyl. At each occurrence, n can be independently about 0 to about 1,000.

At each occurrence, $R^1$ can be independently substituted or unsubstituted $(C_1\text{-}C_{20})$hydrocarbyl. At each occurrence, $R^1$ can be independently selected from the group consisting of $(C_1\text{-}C_{20})$alkyl and $(C_6\text{-}C_{20})$aryl. At each occurrence, $R^1$ can be independently $(C_1\text{-}C_{10})$alkyl. At each occurrence, $R^1$ can be independently $(C_1\text{-}C_5)$alkyl. The variable $R^1$ can be methyl.

The variable $L^1$ can be substituted or unsubstituted $(C_1\text{-}C_{20})$hydrocarbylene. The variable $L^1$ can be substituted or unsubstituted $(C_1\text{-}C_{20})$hydrocarbylene. The variable $L^1$ can be $(C_1\text{-}C_{10})$alkylene. The variable $L^1$ can be $(C_2\text{-}C_5)$alkylene. The variable $L^1$ can be propylene.

At each occurrence, $R^2$ can be independently selected from the group consisting of —H, substituted or unsubstituted $(C_1\text{-}C_{20})$hydrocarbyl, and -$(L^2\text{-}NR^3)_n$—$R^3$. At each occurrence, $R^2$ can be independently selected from the group consisting of —H, $(C_2\text{-}C_5)$alkylene, and -$(L^2\text{-}NR^3)_n$—$R^3$. The variable $R^2$ can be —H.

At each occurrence, $L^2$ can be independently substituted or unsubstituted $(C_1\text{-}C_{20})$hydrocarbylene. The variable $L^2$ can be $(C_1\text{-}C_{10})$alkylene. The variable $L^2$ can be $(C_1\text{-}C_5)$alkylene. The variable $L^2$ can be ethylene.

At each occurrence, $R^3$ can be independently selected from the group consisting of —H, substituted or unsubstituted $(C_1\text{-}C_{20})$hydrocarbyl, and -$(L^2\text{-}NR^2)_n$—$R^2$. At each occurrence, $R^3$ can be independently selected from the group consisting of —H, $(C_2-C_3)$alkylene, and -$(L^2$-$NR^3)_n$—$R^3$. The variable $R^3$ can be H.

The variable $R^4$ can be selected from the group consisting of —H and substituted or unsubstituted $(C_1-C_{20})$hydrocarbyl. The variable $R^4$ can be selected from the group consisting of —H and $(C_1-C_{10})$alkylene. The variable $R^4$ can be H.

The variable $L^3$ can be substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $L^3$ can be —$(C_1-C_{10})$alkylene-O—, wherein the —O— in $L^3$ can be directly bonded to $R^5$. The variable $L^3$ can be —$CH_2$—O—, wherein the —O— in $L^3$ can be directly bonded to $R^5$.

The variable $R^5$ can be substituted or unsubstituted $(C_1-C_{20})$hydrocarbyl. The variable $R^5$ can be $(C_1-C_5)$alkyl$(C_5-C_{15})$aryl. The variable $R^5$ can be $(C_1-C_5)$alkylphenyl. The variable $R^5$ can be methylphenyl. The variable $R^5$ can be ortho-methylphenyl. The variable $R^5$ can have the structure:

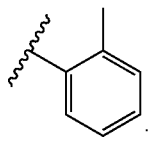

At each occurrence, n can be independently about 0 to about 1,000. The variable n can be about 0 to about 100, about 0 to about 10, about 0, about 1, or less than, equal to, or greater than 2, 3, 4, 5, 6, 7, 8, 9, 10, 12, 14, 16, 18, 20, 25, 30, 35, 40, 45, 50, 60, 70, 80, 90, 100, 150, 200, 250, 500, 750, or about 1,000 or more.

In various embodiments, the tackifier has the structure:

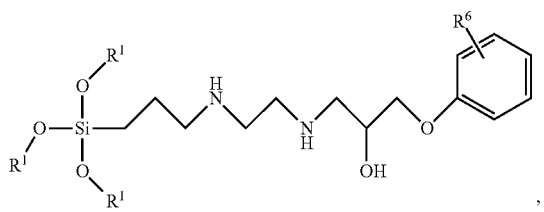

or a salt thereof. At each occurrence, $R^1$ can be independently selected from the group consisting of $(C_1-C_{20})$alkyl and $(C_6-C_{20})$aryl. The variable $R^6$ can be independently selected from the group consisting of $(C_1-C_{20})$alkyl and $(C_6-C_{20})$aryl, wherein $R^6$ is ortho-, meta-, or para-substituted on the phenyl ring.

The tackifier can have the structure:

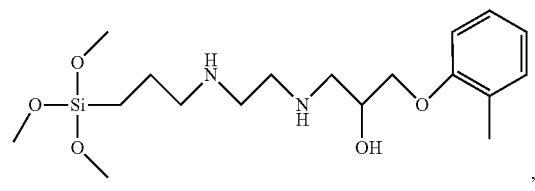 [SMILES: CO[Si](CCCNCCNCC(O)COc1ccccc1C)(OC)OC]

or a salt thereof.

The method can include reacting a mixture of an epoxide component and an amine component to form the silane-based tackifier. The mixture can be any suitable mixture including an epoxide component and an amine component that can be cured to form the tackifier.

The mixture can include one epoxide component or more than one epoxide component. The one or more epoxide components can form any suitable proportion of the mixture curable to form the tackifier, such as about 0.001 wt % to about 90 wt %, about 0.01 wt % to about 60 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 85, or about 90 wt % or more. The epoxide component can have the structure:

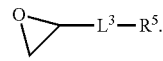

The epoxide component can be ortho-cresyl glycidyl ether.

The mixture can include one amine component or more than one amine component. The one or more amine components can form any suitable proportion of the mixture curable to form the tackifier, such as about 0.001 wt % to about 90 wt %, or about 0.01 wt % to about 60 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 85, or about 90 wt % or more. The amine component can have the structure:

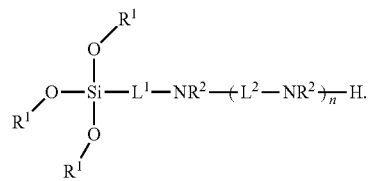

The amine component can be N-(3-(trimethoxysilyl)propyl) ethylenediamine (TMSPD).

Other Components.

The composition including the silane-based tackifier, or a mixture including the composition, can include any suitable additional component in any suitable proportion, such that the silane-based tackifier, composition, or mixture including the same, can be used as described herein. Any component listed in this section can be present or not present in the composition or a mixture including the same.

In some embodiments, a composition including the silane-based tackifier, or a mixture including the same, can also include a secondary tackifier. The composition can include one secondary tackifier or more than one secondary tackifier. The one or more secondary tackifiers can form any suitable proportion of the composition including the silane-based tackifier, such as about 0.001 wt % to about 50 wt %, about 0.01 wt % to about 30 wt %, or about 0.001 wt % or less, or less than, equal to, or greater than about 0.01 wt %, 0.1, 1, 2, 3, 4, 5, 10, 15, 20, 25, 30, 35, 40, 45, or about 50 wt % or more. The secondary tackifier can be any suitable material having tackiness. For example, the secondary tackifier can be an adhesive or a resin. The term "resin" as used herein refers to any of numerous physically similar polymerized synthetics or chemically modified natural resins including thermoplastic materials and thermosetting materials. In some embodiments, the secondary tackifier can be at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin. In some embodiments, the tackifier can be at least one of bisphenol A diglycidyl ether resin, butoxymethyl butyl glycidyl ether resin, bisphenol A-epichlorohydrin resin, and bisphenol F resin. In some embodiments, the secondary tackifier can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the secondary tackifier can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the secondary tackifier can include an amine-containing polymer. In some embodiments, the secondary tackifier can be hydrophobically-modified. In some embodiments, the secondary tackifier can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one ($C_4$-$C_{30}$)hydrocarbyl including at least one of a straight chain, a branched chain, an unsaturated C—C bond, an aryl group, and any combination thereof.

In various embodiments, a composition including the silane-based tackifier, or a mixture including the same, can include one or more curing agents. The curing agent can be any suitable curing agent. For example, the curing agent can include at least one of an amine, an aromatic amine, an aliphatic amine, a cyclo-aliphatic amine, polyamines, amides, polyamides, piperidine, diethylene tetramine, ethylene diamine, triethylamine, benzyldimethylamine, N,N-dimethylaminopyridine, 2-(N N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, azepine, 1,3,5-triazine, thiazole, pteridine, dihydroquinoline, hexa methylene imine, indazole, polyamines, amides, polyamides, 2-ethyl-4-methyl imidazole, 1,1,3-trichlorotrifluoroacetone, and combinations thereof. The one or more curing agents can form any suitable wt % of the composition or a mixture including the same, such as about 0.001 wt % to about 50 wt %, about 0.01 wt % to about 20 wt %, or about 0.001 wt % or less, or less than, equal to, or greater than about 0.01 wt %, 1, 2, 3, 4, 5, 10, 15, 20, 25, 30, 35, 40, 45, or about 50 wt % or more.

The composition including the silane-based coupling agent, or a mixture including the same, can include one or more silane coupling agents. The silane coupling agent can be any suitable silane coupling agent. For example, the silane coupling agent can be a ($C_1$-$C_{30}$)hydrocarbyl-substituted trimethoxysilane, wherein the hydrocarbyl group is substituted or unsubstituted. The silane coupling agent can be N-2-(aminoethyl)-3-aminopropyltrimethoxysilane, 3-glycidoxypropyltrimethoxysilane, or n-beta-(aminoethyl)-gamma-aminopropyltrimethoxysilane. Any suitable amount of the composition or a mixture including the same can be the one or more silane coupling agents, such as about 0.001 wt % to about 20 wt %, or about 0.001 wt % to about 3 wt %, or about 0.001 wt % or less, or less than, equal to, or greater than about 0.01, 0.1, 1, 2, 3, 4, 5, 6, 8, 10, 12, 14, 16, 18, or about 20 wt % or more.

The composition including the silane-based tackifier, or a mixture including the same, can include one or more surfactants. The surfactant can be any suitable surfactant, such as an ionic surfactant, a nonionic surfactant, or a combination thereof. The ionic surfactant, nonionic surfactant, or combination thereof can be chosen from an alkylamine alkoxylate surfactant, alkylamine ethoxylate surfactant, an alcohol alkoxylate surfactant, an alcohol ethoxylate surfactant, a fatty acid alkoxylate surfactant, a fatty acid ethoxylate surfactant, an alkyl glycoside surfactant, an amine-oxide surfactant, an anionic surfactant, a cationic surfactant, a zwitterionic surfactant, an amphoteric surfactant, an amphiphilic surfactant, and a combination thereof (e.g., a chemically compatible combination thereof). The one or more surfactants can form any suitable proportion of the composition or a mixture including the same, such as about 0.001 wt % to about 20 wt %, or about 0.001 wt % to about 3 wt %, or about 0.001 wt % or less, or less than, equal to, or greater than about 0.01, 0.1, 1, 2, 3, 4, 5, 6, 8, 10, 12, 14, 16, 18, or about 20 wt % or more.

The composition including the silane-based tackifier, or a mixture including the same, can include one or more hydrolyzable esters. The hydrolyzable ester can be any suitable hydrolyzable ester. The hydrolyzable ester can be a $C_1$-$C_5$ mono-, di-, tri-, or tetra-alkyl ester of a $C_2$-$C_{40}$ mono-, di-, tri-, or tetra-carboxylic acid. The hydrolyzable ester can be at least one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition or a mixture including the same can be the hydrolyzable ester, such as about 0.01 wt % to about 20 wt %, or about 0.1 wt % to about 5 wt %, or about 0.01 wt % or less, or less, than, equal to, or greater than about 0.1 wt %, 1, 2, 3, 4, 5, 6, 8, 10, 12, 14, 16, 18, or about 20 wt % or more.

In some embodiments, the composition including the silane-based tackifier or a mixture including the same includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition or a mixture including the same, about 0.004 wt % to about 0.01 wt %, or about 0.000,1 wt % or less, or less than, equal to, or greater than about 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen-containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition including the silane-based tackifier or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, di sodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000.01 wt % or less, or less than, equal to, or greater than about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition including the silane-based tackifier or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2-}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2-}$, $Mg^{2+}$, $Zn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or less than, equal to, or greater than about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition including the silane-based tackifier, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, or less than, equal to, or greater than about 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The silane-based tackifier, the composition including the silane-based tackifier, or a mixture including the same, can include any suitable downhole fluid. Combination with a suitable downhole fluid can occur before, during, or after the placement of the tackifier, composition, or mixture in the subterranean formation or the contacting of the tackifier, composition, or mixture and the subterranean material. In some examples, the combination with the downhole fluid occurs above the surface, and then the combined composition is placed in a subterranean formation or contacted with a subterranean material. In another example, the tackifier, composition, or mixture is injected into a subterranean formation to combine with a downhole fluid, and the combined composition is contacted with a subterranean material or is considered to be placed in the subterranean formation. The placement of the tackifier, composition, or mixture in the subterranean formation can include contacting the subterranean material and the tackifier, composition, or mixture. Any suitable weight percent of the composition including the silane-based tackifier a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition including the silane-based tackifier, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLD-TROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTAN™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier, and GELTONE® II organophilic clay. In various embodiments, the composition or a mixture including the same can include one or more additive components such as: X-TEND® II, PAC™—R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants, QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or less than, equal to, or greater than about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A cement fluid can include an aqueous mixture of at least one of cement and cement kiln dust. The composition including the silane-based tackifier or a mixture including the same can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition or a mixture including the same. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

System or Apparatus.

In various embodiments, the present invention provides a system. The system can be any suitable system that can perform an embodiment of a method for using the composition described herein.

In some embodiments, the system can include a tubular disposed in a subterranean formation. The system can further include a pump configured to pump a composition including a tackifier in the subterranean formation through the tubular. The tackifier can have the structure:

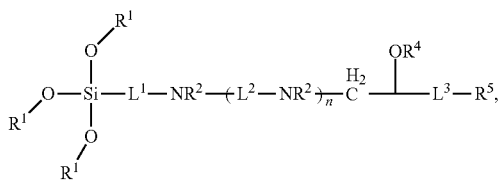

or a salt thereof. At each occurrence, $R^1$ can be independently substituted or unsubstituted $(C_1-C_{20})$hydrocarbyl. The variable $L^1$ can be substituted or unsubstituted $(C_1-C_{20})$ hydrocarbylene. At each occurrence, $R^2$ can be independently selected from the group consisting of —H, substituted or unsubstituted $(C_1-C_{20})$hydrocarbyl, and -$(L^2$-$NR^3)_n$—$R^3$. At each occurrence, $L^2$ can be independently substituted or unsubstituted $(C_1-C_{20})$hydrocarbylene. At each occurrence, $R^3$ can be independently selected from the group consisting of —H, substituted or unsubstituted $(C_1$-$C_{20})$hydrocarbyl, and -$(L$-$NR^2)_n$—$R^2$. The variable $R^4$ can be selected from the group consisting of —H and substituted or unsubstituted $(C_1-C_{20})$hydrocarbyl. The variable $L^3$ can be substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ can be substituted or unsubstituted $(C_1-C_{20})$hydrocarbyl. At each occurrence, n can be independently about 0 to about 1,000.

The system can include a composition including an embodiment of the silane-based tackifier described herein. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems configured for delivering the composition including the silane-based tackifier to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the silane-based tackifier described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of silane-based tackifier therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g. electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Tackifier and Composition Including the Same for Treatment of a Subterranean Formation.

Various embodiments provide a silane-based tackifier for treatment of a subterranean formation, and compositions including the same. The silane-based tackifier can be any suitable silane-based tackifier described herein. The composition can be any suitable composition including one or more silane-based tackifiers, wherein the composition can be used to perform an embodiment of the method for treatment of a subterranean formation described herein.

The tackifier can have the structure:

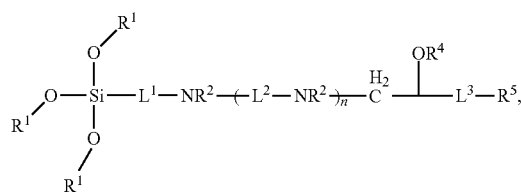

or a salt thereof. At each occurrence, $R^1$ can be independently substituted or unsubstituted $(C_1-C_{20})$hydrocarbyl. The variable $L^1$ can be substituted or unsubstituted $(C_1-C_{20})$ hydrocarbylene. At each occurrence, $R^2$ can be independently selected from the group consisting of —H, substituted or unsubstituted $(C_1-C_{20})$hydrocarbyl, and -($L^2$-$NR^3$)—$R^3$. At each occurrence, $L^2$ can be independently substituted or unsubstituted $(C_1-C_{20})$hydrocarbylene. At each occurrence, $R^3$ can be independently selected from the group consisting of —H, substituted or unsubstituted $(C_1$-$C_{20})$hydrocarbyl, and -($L^2$-$NR^2$)$_n$—$R^2$. The variable $R^4$ can be selected from the group consisting of —H and substituted or unsubstituted $(C_1-C_{20})$hydrocarbyl. The variable $L^3$ can be substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ can be substituted or unsubstituted $(C_1-C_{20})$hydrocarbyl. At each occurrence, n can be independently about 0 to about 1,000.

In some embodiments, the composition further includes a downhole fluid. The downhole fluid can be any suitable downhole fluid. In some embodiments, the downhole fluid is a composition for use in performing a hydraulic fracturing operation of a subterranean formation.

The tackifier can have the structure:

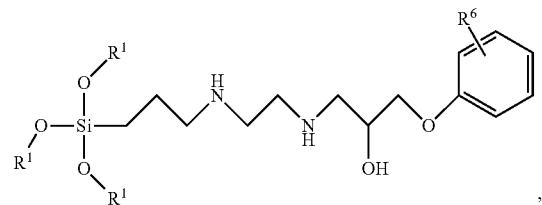

or a salt thereof. At each occurrence $R^1$ can be independently selected from the group consisting of $(C_1-C_{20})$alkyl and $(C_6-C_{20})$aryl. The variable $R^6$ can be independently selected from the group consisting of $(C_1-C_{20})$alkyl and $(C_6-C_{20})$ aryl, wherein $R^6$ is ortho-, meta-, or para-substituted on the phenyl ring.

The tackifier can have the structure:

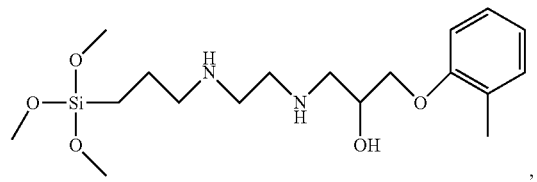 [SMILES: CO[Si](CCCNCCNCC(O)COc1ccccc1C)(OC)OC]

or a salt thereof.

Method for Preparing a Tackifier and Composition Including the Same for Treatment of a Subterranean Formation.

In various embodiments, the present invention provides a method for preparing a tackifier for treatment of a subterranean formation, or a composition including the same for treatment of a subterranean formation. The method can be any suitable method that produces a tackifier or composition including the same described herein. For example, the method can include forming a composition that includes a tackifier having the structure:

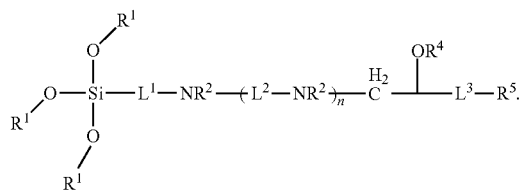

or a salt thereof. At each occurrence, $R^1$ can be independently substituted or unsubstituted $(C_1-C_{20})$hydrocarbyl. The variable $L^1$ can be substituted or unsubstituted $(C_1-C_{20})$ hydrocarbylene. At each occurrence, $R^2$ can be independently selected from the group consisting of —H, substituted or unsubstituted $(C_1-C_{20})$hydrocarbyl, and -($L^2$-$NR^3$)$_n$—$R^3$. At each occurrence, $L^2$ can be independently substituted or unsubstituted $(C_1-C_{20})$hydrocarbylene. At each occurrence, $R^3$ can be independently selected from the group consisting of —H, substituted or unsubstituted $(C_1$-$C_{20})$hydrocarbyl, and -(L-$NR^2$)$_n$—$R^2$. The variable $R^4$ can be selected from the group consisting of —H and substituted or unsubstituted $(C_1-C_{20})$hydrocarbyl. The variable $L^3$ can be substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ can be substituted or unsubstituted $(C_1-C_{20})$hydrocarbyl. At each occurrence, n can be independently about 0 to about 1,000. Forming the composition can include combining the tackifier with one or more components of the composition, to form the composition. In some embodiments, forming the composition can include forming the tackifier, such as via any suitable method described herein, such as including reacting a mixture including an epoxide component and an amine component to form the tackifier.

In various embodiments, the present invention provides a method of preparing a tackifier for treatment. The method can include reacting a mixture including an epoxide component and an amine component to form the tackifier. The epoxide component can have the structure:

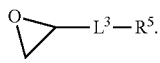

The amine component can have the structure:

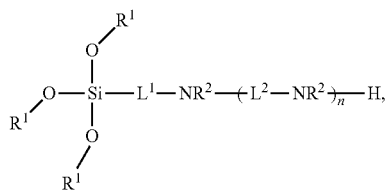

or a salt thereof. The tackifier can have the structure:

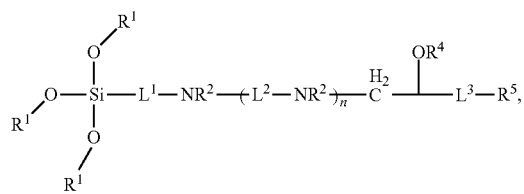

or a salt thereof. At each occurrence, $R^1$ can be independently substituted or unsubstituted $(C_1-C_{20})$hydrocarbyl. The variable $L^1$ can be substituted or unsubstituted $(C_1-C_{20})$ hydrocarbylene. At each occurrence, $R^2$ can be independently selected from the group consisting of —H, substituted or unsubstituted $(C_1-C_{20})$hydrocarbyl, and -$(L^2-NR^3)_n$—$R^3$. At each occurrence, $L^2$ can be independently substituted or unsubstituted $(C_1-C_{20})$hydrocarbylene. At each occurrence, $R^3$ can be independently selected from the group consisting of —H, substituted or unsubstituted $(C_1-C_{20})$hydrocarbyl, and -$(L^2-NR^2)_n$—$R^2$. The variable $R^4$ can be selected from the group consisting of —H and substituted or unsubstituted $(C_1-C_{20})$hydrocarbyl. The variable $L^3$ can be substituted or unsubstituted $(C_1-C_{20})$hydrocarbylene interrupted or terminated by 0, 1, 2, or 3 groups independently selected from the group consisting of —O—, —S—, and substituted or unsubstituted —NH—. The variable $R^5$ can be substituted or unsubstituted $(C_1-C_{20})$hydrocarbyl. At each occurrence, n can be independently about 0 to about 1,000.

In some embodiments, a method of forming the tackifier that includes reacting a mixture of an amine component and an epoxide component can include forming the epoxide component, such as from a haloalkylepoxide and a substituted benzene. The substituted benzene can have the structure $R^5$—H, such as ortho-cresol. The haloalkylepoxide can have the structure:

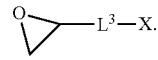

The variable X is a halide, such as —Cl, —Br, or —I. The haloalkylepoxide can be epichlorohydrin.

EXAMPLES

Various embodiments of the present invention can be better understood by reference to the following Examples, which are offered by way of illustration. The present invention is not limited to the Examples given herein.

Example 1. Formation of Tackifier

Ortho-cresyl glycidyl ether (1.64 g) was dissolved in a 50:50 v/v mixture of methanol and isopropyl alcohol (5 mL). N-(3-(Trimethoxysilyl)propyl)ethylenediamine (TMSPD, 2.22 g) was added to the mixture, such that a 1:1 mole ratio of the ertho-cresyl glycidyl ether to the TMSPD were present in the mixture. The solution was gradually heated in a glass beaker under vacuum in an oven to 50° C., with the over connected to a low vacuum to exhaust solvent vapors. The composition was held at 50° C. for 4 hours. During the heating, the alcohol was evaporated and the TMSPD reacted with the ortho cresyl glycidyl ether to form a viscous liquid which included the tackifying agent product. The reaction is illustrated in Scheme 1.

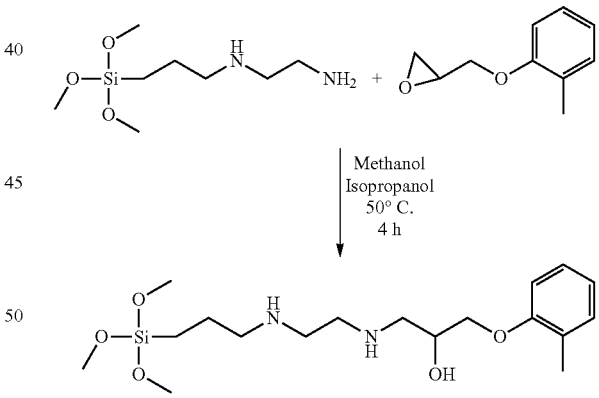

Figure 2:
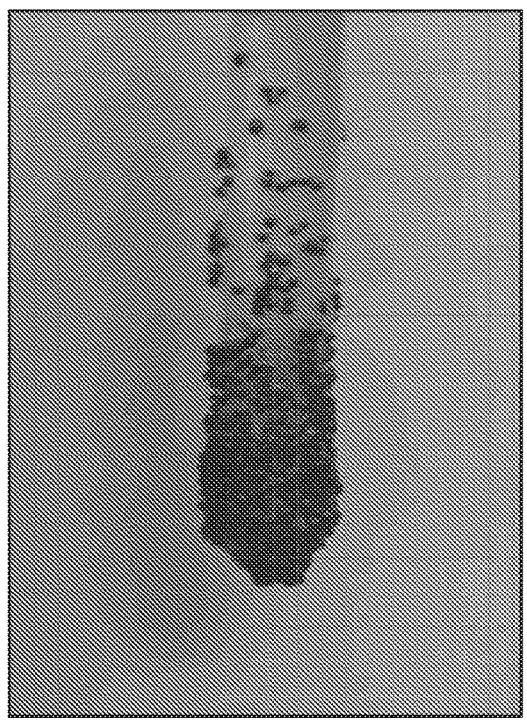
FIG. 2 illustrates a glass rod coated with tackifier and proppant after treatment with water under elevated temperature and pressure, in accordance with various embodiments.

Example 2. Effectiveness of Tackifier Over 10 h at Elevated Temperature and Pressure in Kerosene and Water Two glass rods were coated with the tackifier of Example 1 and proppant particles (sand). One glass rod was submerged in kerosene and placed in an autoclave at 75° C. with 200 psi pressure for 10 h. The other glass rod was submerged in water and placed in the autoclave at 75° C. with 200 psi pressure for 10 h. A photograph showing the results of the test in water after 10 h is illustrated in FIG. 2. The results show that tackiness remained under the test conditions.

Figure 3A:
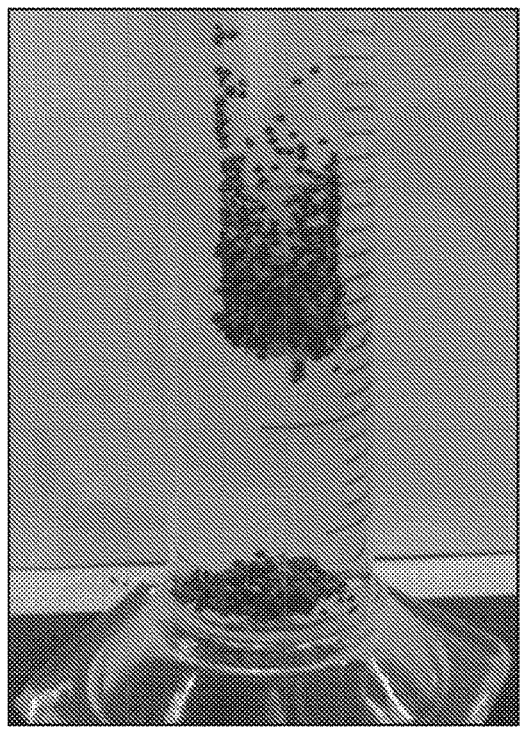
FIG. 3A illustrates a glass rod coated with tackifier and proppant after treatment with water at room temperature and atmospheric pressure, in accordance with various embodiments.
Figure 3B:
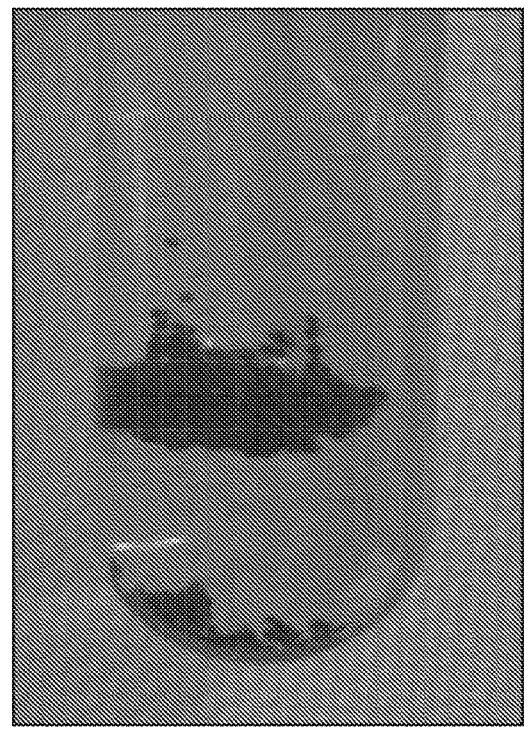
FIG. 3B illustrates a glass rod coated with tackifier and proppant after treatment with kerosene at room temperature and atmospheric pressure, in accordance with various embodiments.

Example 3. Effectiveness of Tackifier Over 15 h at Room Temperature and Atmospheric Pressure in Kerosene and Water Two glass rods were coated with the tackifier of Example 1 and proppant particles (sand). One glass rod was submerged in kerosene. The other glass rob was submerged in water. The glass rods were left for 15 days at room temperature and at atmospheric pressure. Photographs showing the results of the test after 15 d are illustrated in FIGS. 3A-B, with FIG. 3A showing the rod that was submerged in water, and with FIG. 3B showing the rod that was submerged in kerosene. No loss of tackifiying abilities was observed in either test.

Example 4. Effectiveness of Diluted Tackifier with Natural Sand

Figure 4:
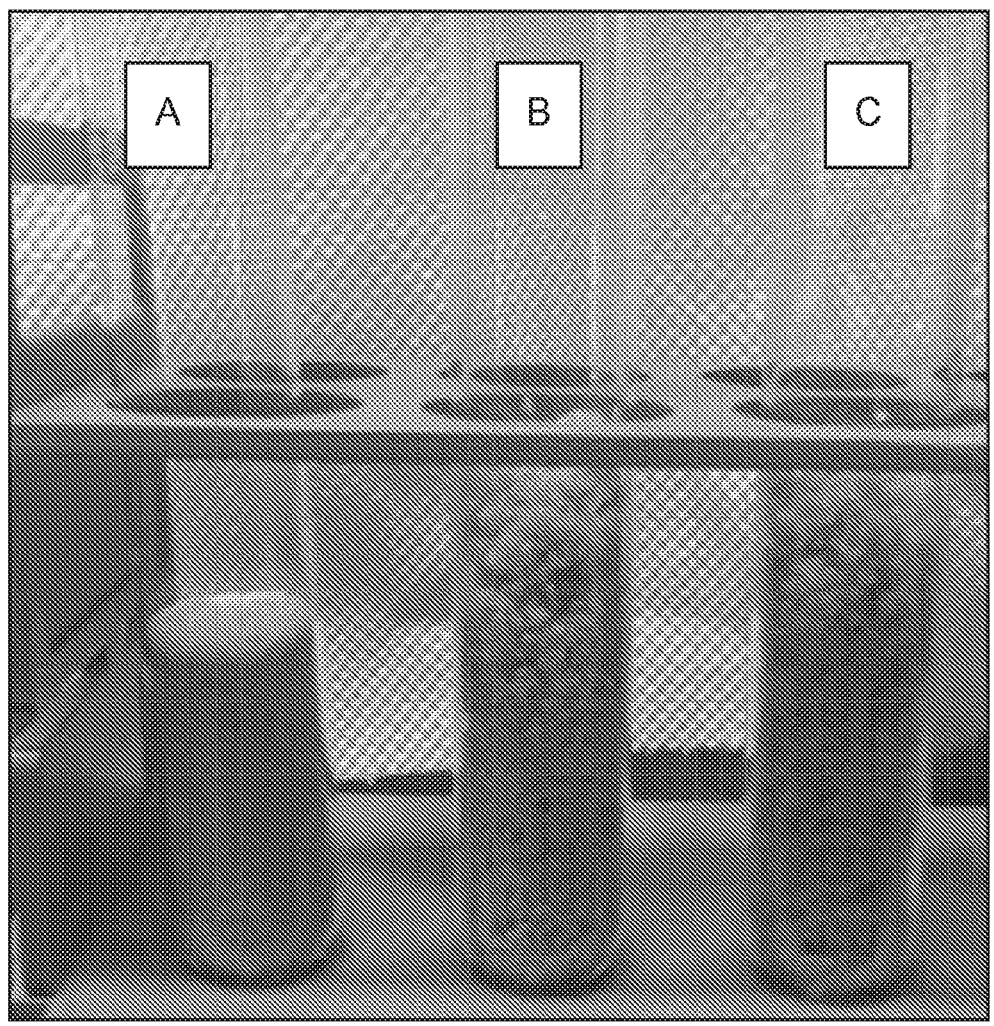
FIG. 4 illustrates a photograph of natural sand (test tube A), and the same mass of natural sand with a tackifier thereon (test tubes B and C), in accordance with various embodiments.

Natural sand (30 g) was added to test tube A. Natural sand (30 g) was mixed with 1 wt % of the tackifier of Example 1 using a spatula. The solvent was allowed to evaporate, and the consolidated sand was placed in test tube B. The conditions used to form the consolidated sand of test tube B were repeated with a fresh batch of natural sand (30 g), and after solvent evaporation the consolidated sand was placed in test tube C A photograph of test tubes A, B, and C is illustrated in FIG. 4.

Figure 5A:
FIG. 5A illustrates natural sand with tackifier in water, in accordance with various embodiments.

Example 5. Effectiveness of Diluted Tackifier with Natural Sand and Carbon Black Fines Natural sand was mixed with 1 wt % of the tackifier of Example 1. Water was combined with the tackifier-coated sand. A photograph of the tackifier-coated sand in water is illustrated in FIG. 5A.

Figure 5B:
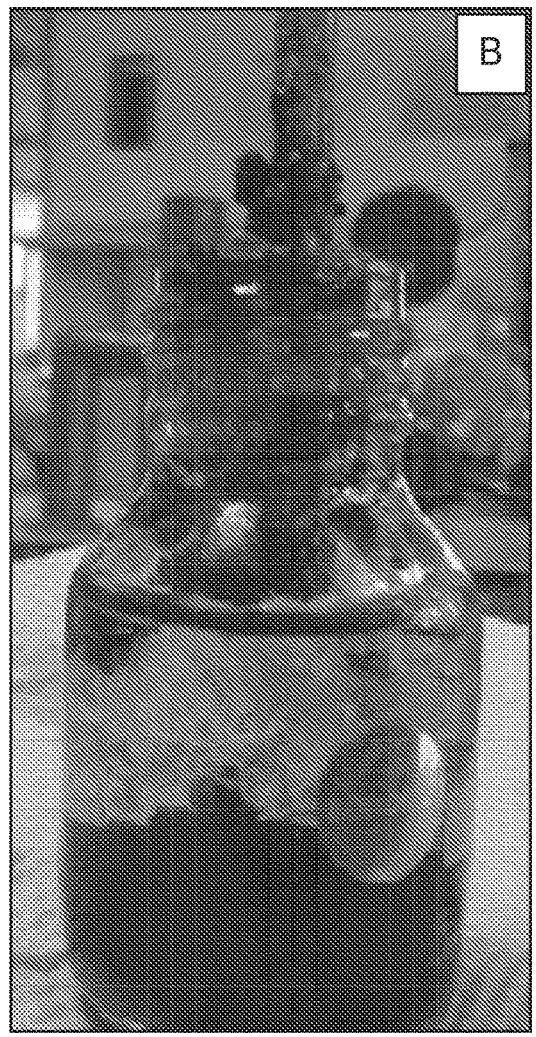
FIG. 5B illustrates natural sand with tackifier in water, in accordance with various embodiments.

Natural sand was mixed with 1 wt % of the tackifier of Example 1. Water was combined with the tackifier-coated sand. Carbon black powder was added to the mixture, which adsorbed on the tackifier. A photograph of the tackifier-coated sand with carbon black in water is illustrated in FIG. 5B. The results indicate that natural sand coated with the tackifier is able to hold carbon black fines even after a couple of washings with water.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in the subterranean formation a tackifier having the structure:

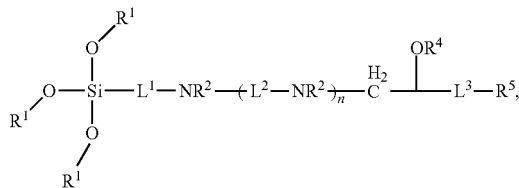

or a salt thereof, wherein at each occurrence. $R^1$ is independently substituted or unsubstituted $(C_1\text{-}C_{20})$hydrocarbyl, $L^1$ is substituted or unsubstituted $(C_1\text{-}C_{20})$hydrocarbylene, at each occurrence, $R^2$ is independently selected from the group consisting of —H, substituted or unsubstituted $(C_1\text{-}C_{20})$hydrocarbyl, and $\text{-}(L^2\text{-}NR^3)_n\text{—}R^3$, at each occurrence, $L^2$ is independently substituted or unsubstituted $(C_1\text{-}C_{20})$hydrocarbylene, at each occurrence, $R^3$ is independently selected from the group consisting of —H, substituted or unsubstituted $(C_1\text{-}C_{20})$hydrocarbyl, and $\text{-}(L^2\text{-}NR^2)_n\text{—}R^2$, $R^4$ is selected from the group consisting of —H and substituted or unsubstituted $(C_1\text{-}C_{20})$hydrocarbyl, $L^3$ is substituted or unsubstituted $(C_1\text{-}C_{20})$hydrocarbylene interrupted or terminated by 0, 1, 2, or 3 groups independently selected from the group consisting of —O—, —S—, and substituted or unsubstituted —NH—, $R^5$ is substituted or unsubstituted $(C_1\text{-}C_{20})$hydrocarbyl, and at each occurrence, n is independently about 0 to about 1,000.

Embodiment 2 provides the method of Embodiment 1, wherein placing the tackifier in the subterranean formation comprises placing a composition comprising the tackifier in the subterranean formation.

Embodiment 3 provides the method of Embodiment 2, wherein the method further comprises obtaining or providing the composition, wherein the obtaining or providing of the composition occurs above-surface.

Embodiment 4 provides the method of any one of Embodiments 2-3, wherein the method further comprises obtaining or providing the composition, wherein the obtaining or providing of the composition occurs in the subterranean formation.

Embodiment 5 provides the method of any one of Embodiments 1-4, wherein the method further comprises reacting a mixture comprising an epoxide component and an amine component to form the tackifier.

Embodiment 6 provides the method of Embodiment 5, wherein the reacting is performed above-surface.

Embodiment 7 provides the method of any one of Embodiments 5-6, wherein the reacting is performed in the subterranean formation, wherein the method comprises placing in the subterranean formation the epoxide component and the amine component.

Embodiment 8 provides the method of any one of Embodiments 5-7, wherein the epoxide component has the structure:

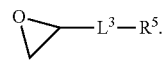

Embodiment 9 provides the method of any one of Embodiments 5-8, wherein the epoxide component is about 0.001 wt % to about 90 wt % of the mixture comprising the epoxide component and the amine component.

Embodiment 10 provides the method of any one of Embodiments 5-9, wherein the epoxide component is about 0.01 wt % to about 60 wt % of the mixture comprising the epoxide component and the amine component.

Embodiment 11 provides the method of any one of Embodiments 5-10, wherein the amine component has the structure:

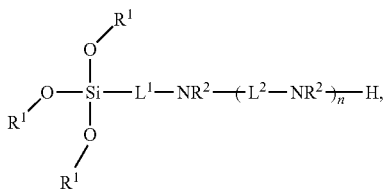

or a salt thereof.

Embodiment 12 provides the method of any one of Embodiments 5-11, wherein the amine component is about 0.001 wt % to about 90 wt % of the mixture comprising the epoxide component and the amine component.

Embodiment 13 provides the method of any one of Embodiments 5-12, wherein the amine component is about 0.01 wt % to about 60 wt % of the mixture comprising the epoxide component and the amine component.

Embodiment 14 provides the method of any one of Embodiments 2-13, wherein the composition further comprises at least one of proppant and gravel.

Embodiment 15 provides the method of Embodiment 14, wherein the proppant or gravel is about 1 wt % to about 90 wt % of the composition.

Embodiment 16 provides the method of any one of Embodiments 14-15, wherein the proppant or gravel is about 5 wt % to about 70 wt % of the composition.

Embodiment 17 provides the method of any one of Embodiments 14-16, wherein the tackifier is at least partially coated on the proppant or gravel.

Embodiment 18 provides the method of any one of Embodiments 1-17, comprising placing the tackifier in at least one of a fracture and flowpath in the subterranean formation.

Embodiment 19 provides the method of Embodiment 18, wherein the fracture is present in the subterranean formation when the tackifier is placed in the subterranean formation.

Embodiment 20 provides the method of any one of Embodiments 18-19, wherein the method comprises hydraulically fracturing the subterranean formation to form the fracture or flowpath.

Embodiment 21 provides the method of any one of Embodiments 1-20, comprising consolidating particulates, proppant, or a combination thereof, with the tackifier.

Embodiment 22 provides the method of any one of Embodiments 2-21, wherein the composition is a consolidation fluid, a remedial treatment fluid, a hydraulic fracturing fluid, a pre-pad fluid, a pad fluid, a proppant slurry, a gravel packing fluid, or a combination thereof.

Embodiment 23 provides the method of any one of Embodiments 2-22, wherein the method comprises hydraulically fracturing the subterranean formation with the composition.

Embodiment 24 provides the method of any one of Embodiments 2-23, wherein the method comprises performing a pre-pad operation with the composition, performing a pad operation with the composition, performing a hydraulic fracturing operation with the composition, performing a remedial treatment with the composition, performing a gravel packing operation with the composition, or a combination thereof.

Embodiment 25 provides the method of any one of Embodiments 2-24, wherein the composition further comprises a carrier liquid.

Embodiment 26 provides the method of any one of Embodiments 2-25, wherein the tackifier is about 0.001 wt % to about 100 wt % of the composition.

Embodiment 27 provides the method of any one of Embodiments 2-26, wherein the tackifier is about 0.01 wt % to about 50 wt % of the composition.

Embodiment 28 provides the method of any one of Embodiments 1-27, wherein at each occurrence, $R^1$ is independently $(C_1-C_{10})$alkyl.

Embodiment 29 provides the method of any one of Embodiments 1-28, wherein at each occurrence, $R^1$ is independently $(C_1-C_5)$alkyl.

Embodiment 30 provides the method of any one of Embodiments 1-29, wherein $R^1$ is methyl.

Embodiment 31 provides the method of any one of Embodiments 1-30, wherein $L^1$ is $(C_1-C_{10})$alkylene.

Embodiment 32 provides the method of any one of Embodiments 1-31, wherein $L^1$ is $(C_2-C_5)$alkylene.

Embodiment 33 provides the method of any one of Embodiments 1-32, wherein $L^1$ is propylene.

Embodiment 34 provides the method of any one of Embodiments 1-33, wherein at each occurrence, $R^2$ is independently selected from the group consisting of —H, $(C_2-C_5)$alkylene, and $-(L^2-NR^3)_n-R^3$.

Embodiment 35 provides the method of any one of Embodiments 1-34, wherein $R^2$ is —H.

Embodiment 36 provides the method of any one of Embodiments 1-35, wherein $L^2$ is $(C_1-C_{10})$alkylene.

Embodiment 37 provides the method of any one of Embodiments 1-36, wherein $L^2$ is $(C_1-C_5)$alkylene.

Embodiment 38 provides the method of any one of Embodiments 1-37, wherein $L^2$ is ethylene.

Embodiment 39 provides the method of any one of Embodiments 1-38, wherein at each occurrence, $R^3$ is independently selected from the group consisting of —H, $(C_2-C_3)$alkylene, and $-(L^2-NR)_n-R^3$.

Embodiment 40 provides the method of any one of Embodiments 1-39, wherein $R^3$ is H.

Embodiment 41 provides the method of any one of Embodiments 1-40, wherein $R^4$ is selected from the group consisting of —H and $(C_1-C_{10})$alkylene.

Embodiment 42 provides the method of any one of Embodiments 1-41, wherein $R^4$ is H.

Embodiment 43 provides the method of any one of Embodiments 1-42, wherein $L^3$ is —$(C_1-C_{10})$alkylene-O—, wherein the —O— in $L^3$ is directly bonded to $R^5$ Embodiment 44 provides the method of any one of Embodiments 1-43, wherein $L^3$ is —$CH_2$—O—, wherein the —O— in $L^3$ is directly bonded to $R^5$.

Embodiment 45 provides the method of any one of Embodiments 1-44, wherein $R^5$ is $(C_1-C_5)$alkyl$(C_5-C_{15})$aryl.

Embodiment 46 provides the method of any one of Embodiments 1-45, wherein $R^5$ is $(C_1-C_5)$alkylphenyl.

Embodiment 47 provides the method of any one of Embodiments 1-46, wherein $R^5$ is methylphenyl.

Embodiment 48 provides the method of any one of Embodiments 1-47, wherein $R^5$ is ortho-methylphenyl.

Embodiment 49 provides the method of any one of Embodiments 1-48, wherein $R^5$ has the structure:

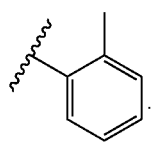

Embodiment 50 provides the method of any one of Embodiments 1-49, wherein n is about 0 to about 100.

Embodiment 51 provides the method of any one of Embodiments 1-50, wherein n is about 0 to about 10.

Embodiment 52 provides the method of any one of Embodiments 1-51, wherein n is 1.

Embodiment 53 provides the method of any one of Embodiments 1-52, wherein the tackifier has the structure:

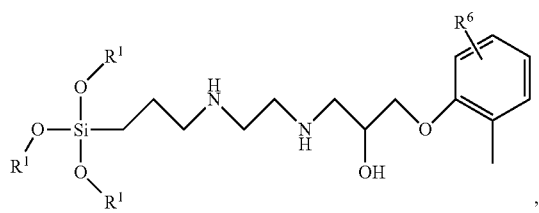

or a salt thereof, wherein
at each occurrence $R^1$ is independently selected from the group consisting of $(C_1\text{-}C_{20})$alkyl and $(C_6\text{-}C_{20})$aryl, and
$R^6$ is independently selected from the group consisting of $(C_1\text{-}C_{20})$alkyl and $(C_6\text{-}C_{20})$aryl, wherein $R^6$ is ortho-, meta-, or para-substituted on the phenyl ring.

Embodiment 54 provides the method of any one of Embodiments 1-53, wherein the tackifier has the structure:

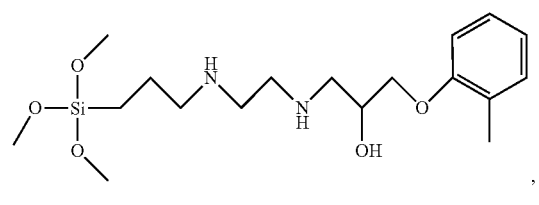 [SMILES: CO[Si](CCCNCCNCC(O)COc1ccccc1C)(OC)OC]

or a salt thereof.

Embodiment 55 provides the method of any one of Embodiments 2-54, wherein the composition further comprises a secondary tackifier.

Embodiment 56 provides the method of any one of Embodiments 2-55, wherein the composition further comprises a curing agent.

Embodiment 57 provides the method of any one of Embodiments 2-56, wherein the composition further comprises a silane coupling agent.

Embodiment 58 provides the method of any one of Embodiments 2-57, wherein the composition further comprises a surfactant.

Embodiment 59 provides the method of any one of Embodiments 2-58, wherein the composition further comprises a hydrolyzable ester.

Embodiment 60 provides the method of any one of Embodiments 2-59, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 61 provides the method of any one of Embodiments 2-60, wherein the placing of the composition in the subterranean formation comprises pumping the composition through a tubular disposed in a wellbore and into the subterranean formation.

Embodiment 62 provides a system for performing the method of any one of Embodiments 2-61, the system comprising:
a tubular disposed in the subterranean formation; and
a pump configured to pump the composition in the subterranean formation through the tubular.

Embodiment 63 provides a method of treating a subterranean formation, the method comprising:
placing in the subterranean formation a tackifier having the structure:

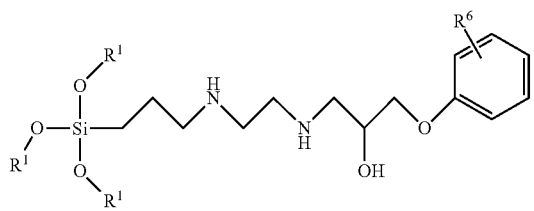

or a salt thereof, wherein
at each occurrence $R^1$ is independently selected from the group consisting of $(C_1\text{-}C_{20})$alkyl and $(C_6\text{-}C_{20})$aryl, and
$R^6$ is independently selected from the group consisting of $(C_1\text{-}C_{20})$alkyl and $(C_6\text{-}C_{20})$aryl, wherein $R^6$ is ortho-, meta-, or para-substituted on the phenyl ring.

Embodiment 64 provides a method of treating a subterranean formation, the method comprising:
placing in the subterranean formation a tackifier having the structure:

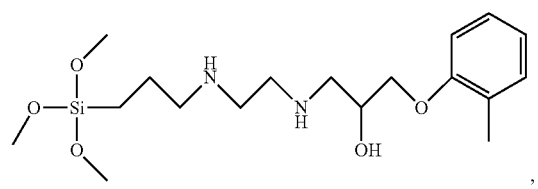 [SMILES: CO[Si](CCCNCCNCC(O)COc1ccccc1C)(OC)OC]

or a salt thereof.

Embodiment 65 provides a system comprising:
a tubular disposed in a subterranean formation; and
a pump configured to pump a composition comprising a tackifier in the subterranean formation through the tubular, wherein the tackifier has the structure:

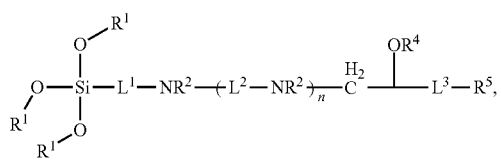

or a salt thereof, wherein at each occurrence, $R^1$ is independently substituted or unsubstituted $(C_1-C_{20})$hydrocarbyl, $L^1$ is substituted or unsubstituted $(C_1-C_{20})$hydrocarbylene, at each occurrence, $R^2$ is independently selected from the group consisting of —H, substituted or unsubstituted $(C_1-C_{20})$hydrocarbyl, and $-(L^2-NR^3)_n-R^3$, at each occurrence, $L^2$ is independently substituted or unsubstituted $(C_1-C_{20})$hydrocarbylene, at each occurrence, $R^3$ is independently selected from the group consisting of —H, substituted or unsubstituted $(C_1-C_{20})$hydrocarbyl, and $-(L^2-NR^2)_n-R^2$, $R^4$ is selected from the group consisting of —H and substituted or unsubstituted $(C_1-C_{20})$hydrocarbyl, $L^3$ is substituted or unsubstituted $(C_1-C_{20})$hydrocarbylene interrupted or terminated by 0, 1, 2, or 3 groups independently selected from the group consisting of —O—, —S—, and substituted or unsubstituted —NH—, $R^5$ is substituted or unsubstituted $(C_1-C_{20})$hydrocarbyl, and at each occurrence, n is independently about 0 to about 1,000.

Embodiment 66 provides a tackifier for treatment of a subterranean formation, the tackifier having the structure:

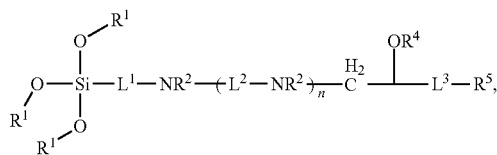

or a salt thereof, wherein at each occurrence, $R^1$ is independently substituted or unsubstituted $(C_1-C_{20})$hydrocarbyl, $L^1$ is substituted or unsubstituted $(C_1-C_{20})$hydrocarbylene, at each occurrence, $R^2$ is independently selected from the group consisting of —H, substituted or unsubstituted $(C_1-C_{20})$hydrocarbyl, and $-(L^2-NR^3)_n-R^3$, at each occurrence, $L^2$ is independently substituted or unsubstituted $(C_1-C_{20})$hydrocarbylene, at each occurrence, $R^3$ is independently selected from the group consisting of —H, substituted or unsubstituted $(C_1-C_{20})$hydrocarbyl, and $-(L^2-NR^2)_n-R^2$, $R^4$ is selected from the group consisting of —H and substituted or unsubstituted $(C_1-C_{20})$hydrocarbyl, $L^3$ is substituted or unsubstituted $(C_1-C_{20})$hydrocarbylene interrupted or terminated by 0, 1, 2, or 3 groups independently selected from the group consisting of —O—, —S—, and substituted or unsubstituted —NH—, $R^5$ is substituted or unsubstituted $(C_1-C_{20})$hydrocarbyl, and at each occurrence, n is independently about 0 to about 1,000.

Embodiment 67 provides a composition comprising the tackifier of Embodiment 66, wherein the composition further comprises a downhole fluid.

Embodiment 68 provides the composition of Embodiment 67, wherein the composition is a composition for fracturing of a subterranean formation.

Embodiment 69 provides a tackifier for treatment of a subterranean formation, the tackifier having the structure:

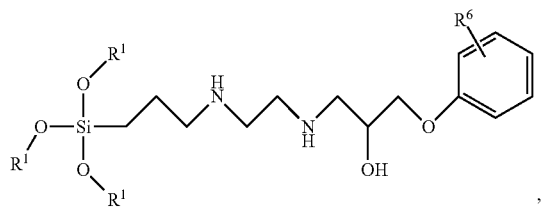

or a salt thereof, wherein at each occurrence $R^1$ is independently selected from the group consisting of $(C_1-C_{20})$alkyl and $(C_6-C_{20})$aryl, and $R^6$ is independently selected from the group consisting of $(C_1-C_{20})$alkyl and $(C_6-C_{20})$aryl, wherein $R^6$ is ortho-, meta-, or para-substituted on the phenyl ring.

Embodiment 70 provides a tackifier for treatment of a subterranean formation, the tackifier having the structure:

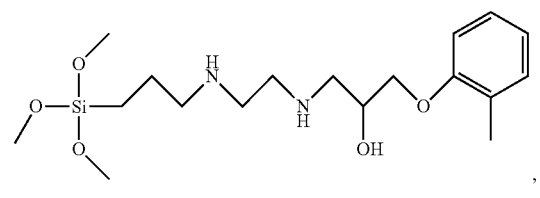 [SMILES: CO[Si](CCCNCCNCC(O)COc1ccccc1C)(OC)OC]

or a salt thereof.

Embodiment 71 provides a method of preparing a composition for treatment of a subterranean formation, the method comprising:

forming a composition comprising a tackifier having the structure:

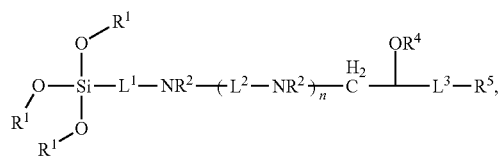

or a salt thereof, wherein at each occurrence, $R^1$ is independently substituted or unsubstituted $(C_1-C_{20})$hydrocarbyl, $L^1$ is substituted or unsubstituted $(C_1-C_{20})$hydrocarbylene, at each occurrence, $R^2$ is independently selected from the group consisting of —H, substituted or unsubstituted $(C_1-C_{20})$hydrocarbyl, and $-(L^2-NR^3)_n-R^3$, at each occurrence, $L^2$ is independently substituted or unsubstituted $(C_1-C_{20})$hydrocarbylene, at each occurrence, $R^3$ is independently selected from the group consisting of —H, substituted or unsubstituted $(C_1-C_{20})$hydrocarbyl, and $-(L^2-NR^2)_n-R$, R⁴ is selected from the group consisting of —H and substituted or unsubstituted (C₁-C₂₀)hydrocarbyl, L³ is substituted or unsubstituted (C₁-C₂₀)hydrocarbylene interrupted or terminated by 0, 1, 2, or 3 groups independently selected from the group consisting of —O—, —S—, and substituted or unsubstituted —NH—, R⁵ is substituted or unsubstituted (C₁-C₂₀)hydrocarbyl, and at each occurrence, n is independently about 0 to about 1,000.

Embodiment 72 provides the method of Embodiment 71, further comprising reacting a mixture comprising an epoxide component and an amine component to form the tackifier.

Embodiment 73 provides a method of preparing a tackifier for treatment of a subterranean formation, the method comprising:

reacting a mixture comprising an epoxide component and an amine component to form the tackifier, the epoxide component having the structure:

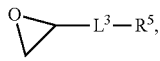

the amine component having the structure:

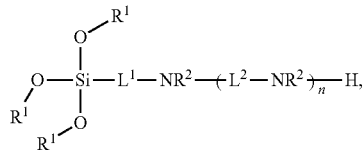

or a salt thereof, and the tackifier having the structure:

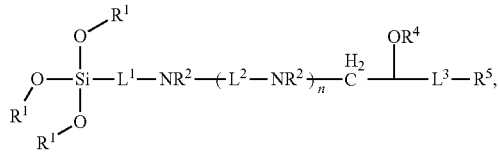

or a salt thereof, wherein at each occurrence. R¹ is independently substituted or unsubstituted (C₁-C₂₀)hydrocarbyl, L¹ is substituted or unsubstituted (C₁-C₂₀)hydrocarbylene, at each occurrence, R² is independently selected from the group consisting of —H, substituted or unsubstituted (C₁-C₂₀)hydrocarbyl, and -(L²-NR³)ₙ—R³, at each occurrence, L² is independently substituted or unsubstituted (C₁-C₂₀)hydrocarbylene, at each occurrence, R³ is independently selected from the group consisting of —H, substituted or unsubstituted (C₁-C₂₀)hydrocarbyl, and -(L²-NR²)ₙ—R², R⁴ is selected from the group consisting of —H and substituted or unsubstituted (C₁-C₂₀)hydrocarbyl, L³ is substituted or unsubstituted (C₁-C₂₀)hydrocarbylene interrupted or terminated by 0, 1, 2, or 3 groups independently selected from the group consisting of —O—, —S—, and substituted or unsubstituted —NH—, R⁵ is substituted or unsubstituted (C₁-C₂₀)hydrocarbyl, and at each occurrence, n is independently about 0 to about 1,000.

Embodiment 74 provides the method, composition, or system of any one or any combination of Embodiments 1-73 optionally configured such that all elements or options recited are available to use or select from.

What is claimed is:

1. A method of treating a subterranean formation, the method comprising:

reacting a mixture comprising an epoxide component and an amine component in a 1:1 ratio to form a tackifier having the structure:

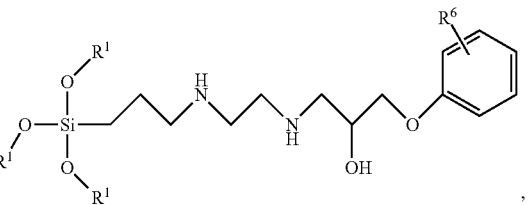

or a salt thereof, wherein at each occurrence R¹ is independently selected from the group consisting of (C₁-C₂₀)alkyl and (C₆-C₂₀)aryl, and R⁶ is independently selected from the group consisting of (C₁-C₂₀)alkyl and (C₆-C₂₀)aryl, wherein R⁶ is ortho-, meta-, or para-substituted on the phenyl ring; and placing the tackifier in the subterranean formation.

2. The method of claim 1, wherein placing the tackifier in the subterranean formation comprises placing a composition comprising the tackifier in the subterranean formation.

3. The method of claim 2, wherein the composition further comprises at least one of proppant and gravel.

4. The method of claim 3, wherein the tackifier is at least partially coated on the proppant or gravel.

5. The method of claim 2, wherein the method comprises performing a pre-pad operation with the composition, performing a pad operation with the composition, hydraulically fracturing the subterranean formation with the composition, performing a remedial treatment with the composition, performing a gravel packing operation with the composition, or a combination thereof.

6. The method of claim 2, wherein the composition further comprises a carrier liquid.

7. The method of claim 2, wherein the composition further comprises a secondary tackifier.

8. The method of claim 2, wherein the composition further comprises a curing agent.

9. The method of claim 2, wherein the composition further comprises a silane coupling agent.

10. The method of claim 2, wherein the composition further comprises a surfactant.

11. The method of claim 2, wherein the composition further comprises a hydrolyzable ester.

12. The method of claim 2, wherein reacting the mixture occurs above-surface.

13. A system for performing the method of claim 2, the system comprising:

a tubular disposed in the subterranean formation; and a pump configured to pump the composition in the subterranean formation through the tubular.

14. The method of claim 1, comprising placing the tackifier in at least one of a fracture and flowpath in the subterranean formation.

15. The method of claim 1, comprising consolidating particulates, proppant, or a combination thereof, with the tackifier.
16. The method of claim 1, wherein the tackifier has the structure:
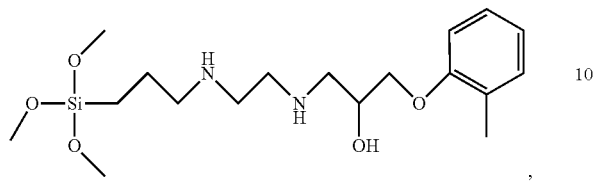
or a salt thereof.
17. The method of claim 1, wherein reacting the mixture occurs above-surface.
18. The method of claim 1, wherein reacting occurs both above-surface and downhole.
* * * * *